US008993029B2

(12) United States Patent
Yamaya et al.

(10) Patent No.: US 8,993,029 B2
(45) Date of Patent: Mar. 31, 2015

(54) INSTANT NOODLES AND METHOD FOR PRODUCING THE SAME

(75) Inventors: Tatsuo Yamaya, Osaka (JP); Takuo Nakazeko, Osaka (JP); Rippei Shikota, Osaka (JP); Koshi Minamitani, Osaka (JP); Susumu Sakaguchi, Osaka (JP); Mitsuru Tanaka, Osaka (JP)

(73) Assignee: Nissin Foods Holdings Co., Ltd., Osaka (JP)

( * ) Notice: Subject to any disclaimer, the term of this patent is extended or adjusted under 35 U.S.C. 154(b) by 0 days.

(21) Appl. No.: 13/697,116

(22) PCT Filed: Mar. 22, 2011

(86) PCT No.: PCT/JP2011/001676
§ 371 (c)(1),
(2), (4) Date: Nov. 9, 2012

(87) PCT Pub. No.: WO2012/127527
PCT Pub. Date: Sep. 27, 2012

(65) Prior Publication Data
US 2013/0059046 A1 Mar. 7, 2013

(51) Int. Cl.
*A23L 1/162* (2006.01)
*A23L 1/00* (2006.01)

(52) U.S. Cl.
CPC ............... *A23L 1/162* (2013.01); *A23L 1/0055* (2013.01)
USPC .......................................... 426/557; 426/451

(58) Field of Classification Search
USPC ................................................ 426/557, 451
See application file for complete search history.

(56) References Cited

U.S. PATENT DOCUMENTS

| | | | |
|---|---|---|---|
| 4,098,906 A | 7/1978 | Hisaki et al. | |
| 4,230,735 A | 10/1980 | Yoshida et al. | |
| 4,728,520 A | 3/1988 | Yamaya et al. | |
| 5,500,236 A * | 3/1996 | Miller et al. | 426/451 |
| 2011/0229613 A1 | 9/2011 | Takizawa et al. | |

FOREIGN PATENT DOCUMENTS

| | | |
|---|---|---|
| GB | 2170091 | 7/1986 |
| JP | 56-28135 | 6/1981 |
| JP | 61-15661 | 1/1986 |
| JP | 61-74554 | 4/1986 |
| JP | 63-52868 | 10/1988 |
| JP | 1-320961 | 12/1989 |
| JP | 2000-093106 | 4/2000 |
| JP | 2002-238454 | 8/2002 |
| JP | 2004-344081 | 12/2004 |
| JP | 2006-122020 | 5/2006 |
| JP | 2006-288239 | 10/2006 |
| JP | 2007-222139 | 9/2007 |
| JP | 2007-330173 | 12/2007 |
| JP | 2011-55789 | 3/2011 |
| WO | WO2010/055860 | 5/2010 |

OTHER PUBLICATIONS

European Search Report in related European Patent Application No. 11861520.2 dated Nov. 26, 2013.
China Office action, dated Nov. 5, 2014 along with an English translation thereof.

* cited by examiner

*Primary Examiner* — Lien T Tran
(74) *Attorney, Agent, or Firm* — Greenblum & Bernstein, P.L.C.

(57) ABSTRACT

The present invention obtains instant noodles which do not cause sticking and are easily loosened. Especially, the present invention provides an instant noodles producing method capable of preventing the sticking of the noodle strings even when the noodle strings are straight-type noodles. In a production process of the instant noodles, powdered oil is applied to the surface of a dough sheet or the surfaces of the noodle strings before steaming. Especially, after the powdered oil is applied to the dough sheet, the dough sheet is rolled out once or more. With this, the powdered oil is firmly fixed to the surfaces of the noodle strings. Thus, an extremely high sticking preventing effect can be obtained by an extremely small amount of the powdered oil.

10 Claims, No Drawings

INSTANT NOODLES AND METHOD FOR PRODUCING THE SAME

TECHNICAL FIELD

The present invention relates to instant noodles which prevent sticking of noodle strings and are easily loosened, and a method of producing such instant noodles.

BACKGROUND ART

Regarding noodles, the most well known method as a method of preventing the sticking of slit noodle strings and improving the loosening of the noodle strings is a method of applying dusting powder to the noodle strings immediately after the noodle strings are obtained by slitting. Typically, wheat flour or starch is used as the dusting powder. By causing wheat flour powder or starch powder to adhere to the surfaces of the noodle strings, moisture on the surfaces of the noodle strings is removed, and the slippage of the noodle strings is increased. Especially, in recent years, oxidized starch and acetylated starch are available as the dusting powder. In addition, also available is dusting powder which is obtained by mixing, for example, calcium carbonate with the oxidized starch or the acetylated starch, has a high sticking preventing effect, does not cause a cooking liquid to be too turbid at the time of cooking, and has excellent properties.

However, such dusting powder is basically used for raw noodles and half-dried noodles to prevent the sticking of the noodle strings in a production process and distribution process and at the time of preservation. Such dusting power cannot effectively prevent the sticking of the noodle strings of boiled noodles, steamed noodles, and instant noodles. This is because in the case of the boiled noodles, steamed noodles, and instant noodles having been subjected to gelatinization, the sticking of the noodle strings occurs since the starch on the surfaces of the noodle string turns into paste during the steaming or after the boiling, and the action mechanism of the occurrence of the sticking herein is different from that of the occurrence of the sticking of the raw noodles.

Especially, regarding, for example, chilled distribution noodles obtained by packing boiled noodles or steamed noodles, to prevent the sticking in a distribution stage and preservation stage and improve the loosening at the time of cooking, oil is applied to the surfaces of the noodle strings after boiled or steamed noodle strings are washed in water.

Meanwhile, as a conventional technology of preventing the sticking of the noodle strings of the instant noodles, a device, called a wave box or conduct tube, configured to control the positions of the noodle strings in a vertical direction is attached at a position immediately after a slitter configured to slit into the noodle strings and performs a treatment (waving treatment) of causing the noodle strings to be strongly wavy. By causing the noodle strings to be strongly wavy as above, a large number of spaces are formed among the noodle strings, the noodle strings do not overlap in a vertical direction, and contact portions among the noodle strings can be reduced. Therefore, the sticking of the noodle strings can be prevented significantly. Further, used in recent years is a method of applying, for example, a low-viscosity polysaccharide thickener solution as a loosening improving agent to steamed noodle strings.

However, in the case of hot-air dried noodles, even if the above-described technology is used for the instant noodles, the sticking of the noodle strings tends to occur, and this causes the problem of a loosening property at the time of cooking in some cases. In a case where the above-described waving treatment is not performed with respect to the noodle strings in order to realize less-wavy straight-type noodles (less-wavy noodles not subjected to the waving treatment are hereinafter referred to as "straight-type noodles"), the sticking of the noodle strings is still an important problem. If the sticking of the noodle strings of the instant noodles occurs, it is difficult to loosen the noodles at the time of cooking and eating, and the noodles are not uniformly rehydrated. In addition, sticking portions are not adequately dried in a drying step, and this adversely affects the preserving property of the noodles in some cases.

In addition to the above methods, PTLs 1 to 3 are the technologies of preventing the sticking of the noodle strings of the instant noodles. PTL 1 describes that by a non-fried noodles producing method of steaming the noodles after causing oil-in-water emulsion of edible fat and oil to adhere to the surfaces of the noodle strings, the non-fried noodles having an excellent rehydration property and an excellent texture can be obtained. PTL 2 describes that the sticking of the noodle strings is prevented by coating the surfaces of the noodle strings, which have not yet been steamed, with heat-coagulatable protein and coagulating the protein by the steaming.

Further, PTL 3 describes that the sticking of the noodle strings of the non-fried noodles which are not wavy is prevented, and smooth noodles having excellent viscoelasticity are obtained. PTL 3 discloses the following four methods: (1) kneading is performed under reduced pressure; (2) powdered oil and/or lecithin are added to noodle ingredients; (3) gluten is added to the noodle ingredients; and (4) water, an emulsified oil solution, or a lecithin solution is applied to the surfaces of the noodle strings before the steaming. However, the methods of these conventional technologies do not realize adequate effects or cause the problems of the noodle quality and the noodle making property, so that an excellent sticking preventing method has been required.

CITATION LIST

Patent Literature

PTL 1: Japanese Examined Patent Application Publication No. 56-28135

PTL 2: Japanese Laid-Open Patent Application Publication No. 61-74554

PTL 3: Japanese Laid-Open Patent Application Publication No. 2006-288239

SUMMARY OF INVENTION

Technical Problem

The present inventors have set as an object of the present invention the realization of instant noodles, especially straight-type noodles not subjected to the waving treatment, which can prevent the sticking of the noodle string, are easily loosened at the time of cooking and eating, do not cause non-uniformity of drying, and have excellent texture. Then, the present inventors have studied various loosening agents, various dusting powder, and the like.

Solution to Problem

As a result, the present inventors have found that an extremely excellent sticking preventing effect can be obtained in such a manner that in a step before steaming the noodle strings in an instant noodles producing process, the powdered oil not in a liquid state but in a solid state is applied to the surface of the dough sheet or the surfaces of the noodle strings to be caused to adhere to the surface of the dough sheet or the surfaces of the noodle strings, especially, the powdered oil is applied to the surface of the dough sheet when the dough sheet is located between a compound rolling machine configured to form the dough sheet and a last roll-out roller configured to roll out the dough sheet. Thus, the present inventors have achieved the present invention. In the present invention, the "surface" denotes a portion exposed to the atmosphere and denotes one or all of an upper surface, lower surface, and side surface.

To be specific, the present invention is a method of producing instant noodles, including: a kneading step; a rolling-out step; a slitting step; a steaming step; and a drying step, wherein before the steaming step, powdered oil is applied to a surface of a dough sheet and/or surfaces of noodle strings. In addition, the present invention is instant noodles which are easily loosened and obtained such that powdered oil is applied to a dough sheet or noodle strings before a steaming step. Especially, the present invention can effectively prevent the sticking of hot-air dried noodles which conventionally tend to cause the sticking and the sticking of straight-type instant noodles obtained by slitting without using a waving box. Since the sticking can be prevented, the noodles are easily loosened at the time of cooking and eating. In addition, the noodles can be dried uniformly, and the non-uniformity of the drying does not occur. Thus, the instant noodles having excellent texture can be obtained. Herein, "applying the powdered oil" denotes that the powdered oil is used as the dusting powder instead of wheat flour or starch typically used as the dusting powder.

It is preferable that in the rolling-out step or after the rolling-out step and before the slitting step in the producing method of the present invention, the powdered oil be applied to the surface of the dough sheet.

As above, by applying the powdered oil to the dough sheet before the steaming, a dramatically high sticking preventing effect can be obtained by the smaller amount of the oil than the amount in a conventional method of adding the powdered oil to the ingredient or the amount in a method of applying or spraying liquid oil to the surfaces of the noodle strings. In addition, the noodle quality and taste are not so affected, and this is extremely good. Especially, since the method of applying the powdered oil is performed with respect to the dough sheet, the powdered oil can be more evenly applied to the noodles than a case where the powdered oil is applied to the noodle strings after slitting. This is because although the powdered oil is unlikely to reach portions where the noodle strings overlap one another when the powdered oil is applied after the slitting, this problem can be solved by applying the powdered oil to the dough sheet.

Especially, in a case where the powdered oil is applied to the dough sheet, in a process in which the dough sheet is rolled out by a plurality of rollers, the powdered oil is applied to the surface of the dough sheet before the dough sheet reaches the last one of the plurality of rollers. With this, after the powdered oil is applied to the surface of the dough sheet, the dough sheet is rolled out at least once by the roll-out roller. Therefore, the powdered oil is firmly fixed to the surfaces of the noodle strings, and the effect is higher. In the case of applying the dusting powder to the dough sheet, an adequate effect can be obtained by applying the dusting powder to only the upper surface or lower surface of the dough sheet. However, a higher effect can be expected by applying the dusting powder to both surfaces of the dough sheet.

It is preferable that in the producing method of the present invention, the powdered oil be applied to the surfaces of the noodle strings after the slitting step and before the steaming step.

As above, by applying the powdered oil to the noodle strings before the steaming, a dramatically high sticking preventing effect can be obtained by the smaller amount of the powdered oil than the amount in the method of adding the powdered oil to the ingredient or the amount in the conventional method of applying or spraying the liquid oil to the surfaces of the noodle strings.

Advantageous Effects of Invention

According to the present invention, solid powdered oil is caused to adhere to the surface of the dough sheet or the surfaces of the noodle strings before the steaming. With this, the solid powdered oil melts during the steaming at high temperature and may act so as to coat the surfaces of the noodle strings. Therefore, the sticking of the noodle strings may be prevented. As above, by causing the powdered oil to adhere to the surfaces of the noodle strings, a dramatically high effect can be obtained by the smaller amount of the oil than the amount in the method of adding the oil to the ingredient or the amount in the method of dusting the liquid oil before or after the steaming. In addition, the taste of the noodles is not so affected, and the oil does not drip off during the rolling-out, the slitting, and the steaming and before or after the steaming. Thus, manufacturing problems are unlikely to occur.

Especially, although the noodle strings overlap one another, the powdered oil can be caused to uniformly adhere to the dough sheet by applying the powdered oil to the dough sheet. By rolling out the dough sheet once or more after the powdered oil is applied to the dough sheet, the powdered oil is firmly fixed to the dough sheet so as to get into the dough sheet by the rolling-out performed after the application of the powdered oil. Therefore, the oil melted during the steaming is prevented from dropping off from the noodle strings without achieving the effect of adequately coating the surfaces of the noodle strings. Thus, the high effect is obtained. Since particles of the powdered oil get into the surfaces of the noodles by the rolling-out, minute depressions and projections are formed on the surfaces of the noodles. Thus, an effect of reducing the contact area among the noodle strings by the depressions and projections on the surfaces of the noodle strings and preventing the sticking may be obtained.

As above, according to the instant noodles of the present invention, the sticking is prevented. Since the sticking of the noodle strings does not occur, the noodles are satisfactorily loosened at the time of cooking and eating. Further, since the sticking of the noodle strings do not occur, the noodles can be dried uniformly, the non-uniformity of the drying does not occur, and the texture is excellent. Especially, the sticking of even the instant noodles of the straight-type noodle strings, which tend to cause the sticking, can be effectively suppressed and prevented.

DESCRIPTION OF EMBODIMENTS

Hereinafter, the present invention will be explained in detail in accordance with a production process.

Used as noodle ingredients in the present invention are typical ingredients of instant noodles. To be specific, wheat flour, starch, buckwheat flour, and other cereal flour may be used as main ingredients. As auxiliary ingredients, salt, brine water, polyphosphate, egg white, gluten, emulsifier, pigment, and the like are suitably selected according to need and added to the main ingredient. The auxiliary ingredient may be added to the main ingredient after it is dissolved or suspended in kneading water or may be added as powder to the main ingredient separately from the kneading water.

Next, these ingredients, auxiliary ingredients, and kneading water are adequately kneaded with, for example, a mixer to produce a noodle dough, and the noodle dough is shaped into a dough sheet by using, for example, a compound rolling machine. The dough sheet is thinly rolled out once or more. When the thickness of the dough sheet has become a final thickness, the dough sheet is slit into noodle strings by a slitting device (slitter).

In the present invention, powdered oil as dusting powder is applied to the surface of the dough sheet or the surfaces of the noodle strings, obtained after the slitting and before steaming, to be caused to adhere to the surface of the dough sheet or the surfaces of the noodle strings. Regarding the method of applying the dusting powder to the dough sheet, it is preferable that the dusting power adhere to the dough sheet as uniformly as possible and as thinly as possible. Therefore, in the case of applying the dusting powder to the upper surface of the dough sheet, a commercially available automatic dusting powder applying device is preferably used. In addition, a spraying device configured to spray powder, an electromagnetic vibrating supply device, or the like may be used. In the case of applying the dusting powder to the lower surface of the dough sheet, the powder spraying device may be used. Alternatively, for example, a method of inverting the dough sheet (inverting a proceeding direction of the dough sheet by, for example, an inverting roller to cause the lower surface to face upward) and applying the dusting powder may be used. In the case of applying the dusting powder to the dough sheet, the highest effect can be obtained by applying the dusting powder to both the upper surface and lower surface of the dough sheet. However, an adequate effect can be obtained by applying the dusting powder to only the upper surface or lower surface of the dough sheet.

In the case of applying the dusting powder to the noodle strings, it is preferable to use a device, such as the automatic dusting powder applying device, configured to dust or spray the powdered oil as evenly as possible. However, the noodle strings complexly or non-uniformly overlap one another, and spaces are formed among the noodle strings. Therefore, it is preferable to apply a force to the noodle strings, for example, vibrate or pull the noodle strings.

In the case of applying the dusting powder to the dough sheet, the dusting powder is applied at a stage before the last rolling-out. With this, the powdered oil having adhered to the dough sheet is firmly fixed to the surface of the dough sheet by the rolling-out of the dough sheet by a next roll-out roller. Therefore, the powdered oil is unlikely to drop off before the steaming step. Moreover, since the powdered oil is firmly fixed to the surface of the dough sheet so as to get into the surface of the dough sheet, the oil having been melted in the steaming step can be prevented from dripping without adequately coating the surfaces of the noodle strings. Further, particles of the powdered oil having gotten into the noodles form slight depressions and projections on the surfaces of the noodle strings, and this may reduce the contact area among the noodle strings. In addition, according to the experiments by the present inventors, a higher sticking preventing effect was obtained by applying the dusting powder to the dough sheet in a step before the last rolling-out.

The powdered oil to be used is solid powder or solid microparticles at normal temperature and melts at the time of the steaming. Specifically, hydrogenated oil of vegetable oil, such as palm oil or rape seed oil, is preferably used, and the hydrogenated oil whose elevation melting point is preferably 45 to 75° C., especially preferably about 55 to 65° C. may be used. Regarding the particle size, the powdered oil whose median size is preferably about 20 to 500 μm, especially preferably about 50 to 200 μm may be used. If the particle diameter is too large, the powdered oil tends to drop off especially in the case of not performing an operation of rolling out the dough sheet after the application of the powdered oil to firmly fix the powdered oil. Regarding the shape of the powdered oil, a shape having excellent flowability is preferable. A spherical shape is preferable since the spherical powdered oil can be dusted uniformly. However, the powdered oil having a needle shape or the like may also be used.

The amount of the powdered oil applied to the dough sheet or the noodle strings is about 0.05 to 2% of the weight of the main ingredient, preferably 0.1 to 2%, and further preferably 0.2 to 1%. This is preferable since the sticking preventing effect becomes high. The application of the powdered oil and the application of the dusting powder, such as wheat flour or starch, may be combined, or the powdered oil may be applied to both the dough sheet and the noodle strings.

The dough sheet is slit into the noodle strings by the slitter. In the case of typical instant noodles, the dough sheet is slit into wavy, curled noodle strings by performing a waving treatment using a wave box (also called a conduct tube). According to the present invention, the sticking of the noodles not subjected to the waving treatment can also be effectively prevented. Therefore, by slitting the dough sheet without using the wave box, the instant noodles of the straight noodle strings can be realized. Although the sticking of the noodle strings can be significantly prevented according to the present invention, needless to say, the other sticking preventing method may also be used at the same time. Especially, in the case of not using the wave box to obtain the straight noodle strings, it is further preferable to perform devisals, for example, use a scraper (scraper configured to remove the noodle strings from grooves of the slitter by rubbing) of a slitting roller, the scraper being configured such that the positions of adjacent tooth tips are shifted from one another (for example, Japanese Laid-Open Patent Application Publication No. 10-210924).

In the case of applying the powdered oil to the noodle strings, the noodle strings are processed as above and then transferred by, for example, a net conveyor to a steam chamber configured to steam the noodle strings. Typically, continuous steaming is performed while transferring the noodle strings in the tunnel-shaped steam chamber by the net conveyor. However, the other device, such as a batch-type steam chamber, may be used. The temperature in the steam chamber is equal to or higher than the melting point of the powdered oil. Therefore, the powdered oil having adhered to the surfaces of the noodle strings melts and coats the surfaces of the noodle strings. Thus, the sticking of the noodle strings is prevented. After the steaming, the noodle strings are further boiled in a short period of time according to need, and then are immersed in a seasoning liquid in a short period of time or sprayed with the seasoning liquid according to need. Then, the noodle strings are cut into the noodle stings corresponding to one meal, and the noodle strings corresponding to one meal are put in a retainer. Cutting the noodle strings into the noodle strings corresponding to one meal may be performed in any step after the slitting of the dough sheet into the noodle strings and before the putting of the noodle strings in the retainer.

In a case where the final form of the instant noodles is fried noodles, the noodles put in the retainer are fried for about one to three minutes in frying oil of about 140 to 160° C. by entirely putting the retainer in the frying oil. Thus, the noodles are dried. Meanwhile, in a case where the final form of the instant noodles is non-fried noodles, for example, in a case where the final form of the instant noodle is hot-air dried noodles, the retainer is put in a drying chamber, and the noodles are dried for about 20 to 180 minutes at a temperature of about 80 to 130° C. Moreover, the noodles may be dried by using microwave, superheated steam, or the like.

The instant noodles of the present invention may be cup noodles eaten by pouring boiling water to a cup container and waiting for several minutes or may be plastic bag noodles cooked by boiling the noodles in a short period of time. In both cases, the sticking of the noodle strings can be prevented or suppressed. Therefore, the non-uniformity of the drying is unlikely to occur at the time of the drying by the above-described frying in oil, hot-air drying, or the like. In addition, the noodles are uniformly rehydrated at the time of cooking, and the noodles having excellent taste and texture can be obtained.

EXAMPLES

Experiment 1

Application of Dusting Powder to Dough Sheet

Example 1

Application of Powdered Oil to Dough Sheet

The main ingredient was prepared by adding 150 g of starch to 850 g of semi-hard flour. 390 ml of kneading water in which 20 g of salt, 5 g of polyphosphate, and 10 g of thickener were dissolved as the auxiliary ingredients was added to the main ingredient. These were adequately mixed and kneaded with a mixer to prepare the noodle dough. This noodle dough was shaped into the dough sheet having a thickness of 11 mm by the compound rolling machine. The dough sheet was gradually rolled out five times by the roll-out roller, and the final thickness of the dough sheet became 1.35 mm. Before the dough sheet was subjected to the last rolling-out by the roll-out roller, powdered hydrogenated oil (hydrogenated palm oil whose elevation melting point was 58.5° C., 80% or more of particles of which had a particle diameter of 50 to 200 μm, and whose median size was 130 μm) was evenly applied to the upper surface of the dough sheet by using the automatic dusting powder applying device ("Starch dusting machine" produced by Yutaka Manufacturing, Co., Ltd). The amount of the powdered hydrogenated oil applied was 1% (10 g) of the weight of the main ingredient.

The dough sheet was slit into the noodle strings by a typical slitter of a square blade No. 9, and the noodle strings were transferred to the tunnel-shaped steam chamber by the net conveyor without using the wave box. The noodle strings were steamed for one minute and thirty seconds by saturated steam of about 100° C. and then boiled for five seconds in boiling water. The noodle strings were immersed in the seasoning liquid of 60° C. in an extremely short period of time. The noodle strings were cut into 130 g of the noodle strings corresponding to one meal, and 130 g of the noodle strings were put in the retainer of φ120 mm×φ105 mm×38 mm in height and fried for two minutes at a temperature of 145° C. Thus, the instant fried noodles were produced.

Example 2

Application of Different Powdered Oil to Dough Sheet

The instant fried noodles of Example 2 were produced in the same manner as Example 1 except that hydrogenated rape seed oil (hydrogenated rape seed oil whose elevation melting point was 65° C., 80% of particles of which had a particle diameter of 45 to 180 μm, and whose median size was 100 μm) was used as the powdered hydrogenated oil instead of the hydrogenated palm oil used in the producing method of Example 1.

Comparative Example 1

Control

The instant fried noodles of Comparative Example 1 were produced in the same manner as Example 1 except that the powdered oil having been applied in the producing method of Example 1 was not applied.

Comparative Example 2

Application of Phosphorylated Cross-Linked Rice Starch to Dough Sheet

The instant fried noodles of Comparative Example 2 were produced in the same manner as Example 1 except that phosphorylated cross-linked rice starch (having a particle diameter of 2 to 8 μm), which is used as the dusting powder applied to, for example, raw noodles, was used instead of the powdered oil used in the producing method of Example 1, the amount of the phosphorylated cross-linked rice starch applied being 1% of the weight of the main ingredient as with Example 1.

Comparative Example 3

Application of Oxidized Potato Starch to Dough Sheet

The fried noodles of Comparative Example 3 were produced in the same manner as Comparative Example 2 except that oxidized potato starch (having a particle diameter of 2 to 100 μm) was used instead of the starch used as the dusting powder in the producing method of Comparative Example 2.

The instant fried noodles produced by the producing methods of Examples and Comparative Examples were straight-type noodles which were not wavy. Respective noodle lumps were put in cup containers made of polystyrene to produce cup-type instant noodles to which the boiling water is poured. 420 ml of the boiling water was added to each container. The containers were closed by lids and left for five minutes. Then, the noodles were lightly loosened with chopsticks. The noodles were picked up with chopsticks to confirm the sticking state of the noodle strings. Five panelists ate these noodles to confirm the rehydration states and textures of the noodles. The loosening property of the noodles was evaluated on a scale on which 5 is perfection in such a manner that after the noodles were left for five minutes, the noodles were immediately, lightly loosened with chopsticks, picked up, and stirred. The evaluation was made as below, and 4 or more was regarded as "Pass".

5: The loosening property is excellent, and chopsticks can be moved smoothly.

4: The noodles are loosened by lightly mixing up the noodles with chopsticks.

3: The noodles are loosened by strongly mixing up the noodles with chopsticks.

2: Some of the noodles stick and are not loosened even by strongly mixing up the noodles with chopsticks.

1: Many of the noodles stick, and the loosening property is extremely low.

Results of Examples 1 and 2 and Comparative Examples 1, 2, and 3 are shown in Table 1 below

TABLE 1

|  | Dusting powder to dough sheet | Loosening property | Texture | Evaluation by panelists |
| --- | --- | --- | --- | --- |
| Example 1 | Powdered hydrogenated oil (Hydrogenated palm oil) | 5 | Not affected | No problem |
| Example 2 | Powdered hydrogenated oil (Hydrogenated rapeseed oil) | 4 | Not affected | No problem |
| Comparative Example 1 | Dusting powder was not applied | 2 | Not affected | Some of the noodles were not adequately rehydrated. |
| Comparative Example 2 | Phosphorylated crosslinked rice starch | 1 | Not affected | Many of the noodles were not adequately rehydrated. |
| Comparative Example 3 | Oxidized potato starch | 2 | Not affected | Some of the noodles were not adequately rehydrated. |

Experiment 2

Application of Dusting Powder to Noodle Strings

Example 3

Application of Powdered Oil to Noodle Strings

Unlike the producing method of Example 1, the powdered oil was not applied to the dough sheet, but the same powdered hydrogenated oil (hydrogenated palm oil) as Example 1 was applied by the same automatic dusting powder applying device as Example 1 to the noodle strings while the noodle strings were being transferred on the conveyor after the dough sheet was slit and before the noodle strings were steamed. As with Example 1, the amount of the powdered hydrogenated oil applied was 1% of the weight of the main ingredient. The other steps were the same as those of Example 1. Thus, the instant fried noodles of Example 3 were produced.

Comparative Example 4

Application of Starch to Noodle Strings

Instead of the application of the powdered oil to the noodle strings in Example 3, oxidatively-treated sago starch was applied to the noodle strings in the same manner as Example 3. As with Example 3, the amount of the oxidatively-treated sago starch applied was 1% of the weight of the main ingredient. The other steps were the same as those of Example 3. Thus, the instant fried noodles of Comparative Example 4 were produced.

TABLE 2

|  | Dusting powder to noodle strings | Loosening property | Texture | Evaluation by panelists |
| --- | --- | --- | --- | --- |
| Example 3 | Powdered hydrogenated oil | 4 | Not affected | The effect was lower than that of Example 1 |
| Comparative Example 4 | Starch | 3 | Not affected | The sticking was slightly observed |

Experiment 3

Method of Using Oil and Fat

Comparative Example 5

Method of Dusting Liquid Oil to Dough Sheet

Instead of the application of the powdered oil to the dough sheet in the producing method of Example 1, liquid refined palm olein oil (oil in liquid form at normal temperature) was uniformly sprayed to the dough sheet. The amount of the liquid refined palm olein oil was 1% of the weight of the main ingredient. The other steps were the same as those of Example 1. Thus, the instant fried noodles of Comparative Example 5 were produced.

Comparative Example 6

Method of Mixing Noodle Ingredients with Powdered Oil and Fat

Instead of the application of the powdered oil to the dough sheet in the producing method of Example 1, as the auxiliary ingredient, the same powdered hydrogenated oil (hydrogenated palm oil) as Example 1 was added to and mixed with the noodle ingredients. The amount of the powdered hydrogenated oil was 1% of the weight of the main ingredient. The other steps were the same as those of Example 1. Thus, the instant fried noodles of Comparative Example 6 were produced.

As with Experiment 1, the noodles of Comparative Examples 5 and 6 were rehydrated. Then, the panelists confirmed the loosening property and evaluated by eating those noodles. Results of the evaluation were shown in Table 3.

TABLE 3

|  | Oil processing method | Loosening property | Texture | Evaluation by panelists |
| --- | --- | --- | --- | --- |
| Example 1 | Apply powdered oil to dough sheet | 5 | Not affected | No problem |
| Comparative Example 5 | Spray liquid oil to dough sheet | 3.5 | The texture was like the texture of noodles not adequately steamed. The surfaces of the noodles were stiff. | Dripping of oil occurred, manufacture aptitude was problematic, and it is difficult to use. |

TABLE 3-continued

| | Oil processing method | Loosening property | Texture | Evaluation by panelists |
|---|---|---|---|---|
| Comparative Example 6 | Add oil to noodle ingredients | 3 | Slightly too soft | The loosening effect is not high. |

In the case of the spraying of the liquid oil in Comparative Example 5, the oil did not penetrate into the dough sheet. Therefore, production problems were confirmed. For example, the dough sheet slipped on the roll-out roller, and the oil adhered to the roll-out roller and the slitter. Regarding the texture, in the case of spraying the liquid oil, the surfaces of the noodle strings became stiff, and the texture was adversely affected. In Comparative Example 6, an adequate effect was not obtained by adding the powdered oil to the ingredients, the amount of the powdered oil added being the same as that of a case where the powdered oil was applied to the dough sheet. Here, the same experiment was conducted except that the amount of the powdered oil added was increased. When the amount of the powdered oil added was three times that of the case where the powdered oil was applied to the dough sheet (the amount of the powdered oil added was 3% of the main ingredient of the noodles), moderately satisfactory results were obtained regarding the sticking of the noodle strings and the loosening property. However, the noodles were strongly affected by the powdered oil. For example, the texture of the noodles was not elastic, and regarding the taste and flavor, the taste of the oil was felt. The clumping of the noodle dough at the time of noodle making was deteriorated, and the noodle making property was also deteriorated.

Experiment 4

Amount of Powdered Oil Applied to Dough Sheet being Changed

Example 4

Unlike the producing method of Example 1, the amount of the powdered hydrogenated oil applied to the dough sheet was set to 0.6% of the weight of the main ingredient. The other steps were the same as those of Example 1. Thus, the instant fried noodles of Example 4 were produced.

Example 5

Unlike the producing method of Example 1, the amount of the powdered hydrogenated oil applied to the dough sheet was set to 0.3% of the weight of the main ingredient. The other steps were the same as those of Example 1. Thus, the instant fried noodles of Example 5 were produced.

As with Experiment 1, the noodles of Examples 4 and 5 were rehydrated. Then, the panelists confirmed the loosening property and evaluated by eating those noodles. Results of the evaluation were shown in Table 4.

TABLE 4

| | Amount of dusting powder applied to dough sheet | Loosening property | Texture | Evaluation by panelists |
|---|---|---|---|---|
| Example 1 | 1.0% | 5 | Not affected | No problem |
| Example 4 | 0.6% | 5 | Not affected | No problem |
| Example 5 | 0.3% | 4 | Not affected | No problem |

According to the results of Experiment 4, a significantly high effect was obtained even when the amount of the powdered hydrogenated oil applied to the dough sheet was 0.3% of the weight of the main ingredient. Therefore, it was determined that 0.2% was adequately effective, and even about 0.1% was effective.

Example 6

Hot-Air Dried Instant Noodles

The main ingredient was prepared by adding 100 g of starch to 900 g of semi-hard flour. 380 ml of kneading water in which 20 g of salt, 9 g of brine water, and 1 g of polyphosphate were dissolved as the auxiliary ingredients was added to the main ingredient. These were adequately mixed and kneaded with a mixer to prepare the noodle dough. This noodle dough was shaped into the dough sheet having a thickness of 11 mm by the compound rolling machine. The dough sheet was gradually rolled out five times by the roll-out roller, and the final thickness of the dough sheet became 1.15 mm. Before the dough sheet was subjected to the last rolling-out by the roll-out roller, powdered hydrogenated oil (hydrogenated palm oil whose elevation melting point was 58.5° C., 80% or more of particles of which had a particle diameter of 50 to 200 μm, and whose median size was 130 μm) was evenly applied to the upper surface of the dough sheet by using the automatic dusting powder applying device ("Starch dusting machine" produced by Yutaka Manufacturing, Co., Ltd). The amount of the powdered hydrogenated oil applied was 1% (10 g) of the weight of the main ingredient.

The dough sheet was slit into the noodle strings by a typical slitter of a round blade No. 20, and the noodle strings were transferred to the tunnel-shaped steam chamber by the net conveyor without using the wave box. The noodle strings were steamed for one minute and thirty seconds by saturated steam of about 100° C. The noodle strings were then cut into 130 g of the noodle strings corresponding to one meal and boiled in boiling water for 60 seconds. The noodle strings were washed and cooled in water and then immersed in a seasoning liquid of 20° C. for 15 seconds. Then, the noodle strings were put in the retainer of φ148.5 mm×φ132.5 mm×30 mm in height and subjected to hot-air drying (primary drying performed at 100° C. for 12 minutes and secondary drying performed at 85° C. for 24 minutes).

The instant hot-air dried noodles of Example 6 produced as above were cooled, and the noodle lump was put in a bowl-type container made of polystyrene to produce cup-type instant noodles to which the boiling water is poured. 420 ml of the boiling water was added to the container. The container was closed by a lid and left for four minutes. Then, the noodles were lightly loosened with chopsticks. The noodles were picked up with chopsticks to confirm the sticking state of the noodle strings. As a result, the excellent noodles were obtained, that is, the sticking of the noodle strings was not observed, the loosening property was excellent, and the texture was uniform.

INDUSTRIAL APPLICABILITY

The present invention is useful to improve the quality of instant noodles.

The invention claimed is:

1. A method of producing instant noodles, comprising:
   a kneading step of kneading noodle ingredients and kneading water to produce a noodle dough;
   a shaping step of shaping the noodle dough into a dough sheet;
   a rolling-out step of rolling out the dough sheet;
   a slitting step of slitting the dough sheet into noodle strings;
   a steaming step of steaming the noodle strings; and
   a drying step of drying the steamed noodle strings to produce the instant noodles,
   wherein before the steaming step, powdered oil is applied to a surface of the dough sheet and/or surfaces of the noodle strings.

2. The method according to claim 1, wherein in the rolling-out step or after the rolling-out step and before the slitting step, the powdered oil is applied to the surface of the dough sheet.

3. The method according to claim 1, wherein a method of applying the powdered oil to the dough sheet is performed in such a manner that in a process in which the dough sheet is rolled out by a plurality of rollers in the rolling-out step, the powdered oil is applied to the surface of the dough sheet before the dough sheet reaches a last one of the plurality of rollers.

4. The method according to claim 1, wherein the surface of the dough sheet denotes an upper surface and/or lower surface of the dough sheet.

5. The method according to claim 1, wherein the powdered oil is applied to the surfaces of the noodle strings after the slitting step and before the steaming step.

6. A method of preventing sticking of instant noodles, comprising:
   a kneading step of kneading noodle ingredients and kneading water to produce a noodle dough;
   a shaping step of shaping the noodle dough into a dough sheet;
   a rolling-out step of rolling out the dough sheet;
   a slitting step of slitting the dough sheet into noodle strings;
   a steaming step of steaming the noodle strings; and
   a drying step of drying the steamed noodle strings to produce the instant noodles,
   wherein before the steaming step, powdered oil is applied to a surface of the dough sheet and/or surfaces of the noodle strings.

7. The method according to claim 2, wherein a method of applying the powdered oil to the dough sheet is performed in such a manner that in a process in which the dough sheet is rolled out by a plurality of rollers in the rolling-out step, the powdered oil is applied to the surface of the dough sheet before the dough sheet reaches a last one of the plurality of rollers.

8. The method according to claim 2, wherein the surface of the dough sheet denotes an upper surface and/or lower surface of the dough sheet.

9. The method according to claim 3, wherein the surface of the dough sheet denotes an upper surface and/or lower surface of the dough sheet.

10. The method according to claim 7, wherein the surface of the dough sheet denotes an upper surface and/or lower surface of the dough sheet.

* * * * *